(12) United States Patent
Lee et al.

(10) Patent No.: US 6,566,597 B2
(45) Date of Patent: May 20, 2003

(54) SHIELD ASSEMBLY FOR COMPUTER ENCLOSURE AND PRESSING MACHINE FOR MAKING IT

(75) Inventors: Sheng Ching Lee, Taipei (TW); Ya Qiang He, Shenzhen (CN); Pin Cheng, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 93 days.

(21) Appl. No.: 09/756,836

(22) Filed: Jan. 9, 2001

(65) Prior Publication Data

US 2002/0088100 A1 Jul. 11, 2002

(51) Int. Cl.⁷ ................................................. H05K 9/00
(52) U.S. Cl. .............................. 174/35 R; 174/35 GC; 174/135
(58) Field of Search ..................... 174/35 R, 35 GC, 174/66, 135; 361/816, 818

(56) References Cited

U.S. PATENT DOCUMENTS 5,175,395 A * 12/1992 Moore ..................... 174/35 R
5,349,132 A * 9/1994 Miller et al. ............. 174/35 R
5,999,416 A * 12/1999 McAnally et al. .......... 361/816

* cited by examiner

Primary Examiner—Dean A. Reichard
Assistant Examiner—W. David Walkenhorst

(57) ABSTRACT

A pressing machine (10) for combining metal members (16) and plastic members (14) of shield assembles (12) includes a workbench (60), a cylinder (54), a guide device (100), and a pressing device (200). The workbench defines channels (70) for receiving the corresponding plastic members thereon. The pressing device includes two pressing blocks (220) defining cross indentions (228) for receiving protrusions formed in the plastic members to allow the metal members to be downwardly pressed thereby causing the cross cuts defined in the metal member to engage with the cross protrusions of the plastic member, and a pressing bar (222) forming pressing feet (232) for downwardly pressing inclined plates (40) formed in the metal members to allow apertures (42) defined in the inclined plates to engage with projections (24) formed in the tabs (22) of the plastic members.

10 Claims, 5 Drawing Sheets

SHIELD ASSEMBLY FOR COMPUTER ENCLOSURE AND PRESSING MACHINE FOR MAKING IT

BACKGROUND OF THE INVENTION

1. Field of the Invention

The present invention relates to a shield assembly for a computer enclosure and a pressing machine for making the shield assembly, and particularly to a shield assembly for ready attaching to a computer enclosure and a pressing machine for pressing the shield assembly together.

2. Related Art

A support bracket in a computer enclosure often defines a number of cavities for accommodating data storage devices therein. A front panel of the computer enclosure accordingly defines a number of openings for insertion of the data storage devices. A number of metal shields is attached in the openings of the front panel, to prevent electromagnetic radiation generated by the computer from coming out of the computer. Such metal shields are commonly integral with the front panel. When a data storage device is required to be installed, a metal shield is removed from the front panel using a tool.

However, removing this kind of metal shield from the front panel with a tool is unduly inconvenient. Furthermore, the metal shield cannot be reused. Thus when a data storage device is removed from the support bracket, the opening of the front panel cannot be covered back over again with the shield. This allows electromagnetic radiation to come out of the computer, or necessitates use of a replacement shield.

It is strongly desired to provide a shield assembly for a computer enclosure which overcomes the above problems encountered in the related art.

SUMMARY OF THE INVENTION

Accordingly, an object of the present invention is to provide a shield assembly for covering an opening defined in a computer enclosure, to prevent electromagnetic radiation from coming out of the computer.

Another object of the present invention is to provide a pressing machine which can readily make the shield assembly.

To achieve the above-mentioned objects, a shield assembly of the present invention comprises a plastic member and a metal member attached on the plastic member. The plastic member forms a tab with a projection and a plurality of cross protrusions. The metal member has a gap for extension of the tab therethrough, an inclined plate defining an aperture for engaging with the projection to prevent the metal member from moving relative to the plastic member in a vertical direction, and a plurality of cross cuts for engaging with the cross protrusions to prevent the metal member from moving relative to the plastic member in a horizontal direction.

The pressing machine for combining the metal member and the plastic member of the shield assembly together comprises a workbench, a cylinder, a guide device, a pressing device and a coupling bar connected between the cylinder and the pressing device. The workbench comprises a position board defining a plurality of channels for receiving the corresponding plastic members thereon. The pressing device comprises a pair of pressing blocks and a pressing bar between the pressing blocks. Each pressing block defines a plurality of cross indentions for receiving the protrusions of the plastic members. This allows the metal member to be downwardly pressed, thereby causing the cross cuts of the metal member to engage with the cross protrusions of the plastic member. The pressing bar comprises a plurality of pressing feet for downwardly pressing the inclined plates of the metal members, to allow the inclined plates to engage with the projections of the plastic member in the apertures thereof.

Other objects, advantages and novel features of the present invention will be drawn from the following detailed description of preferred embodiments of the present invention with reference to the attached drawings, in which:

DESCRIPTION OF THE PREFERRED EMBODIMENTS

Figure 1:
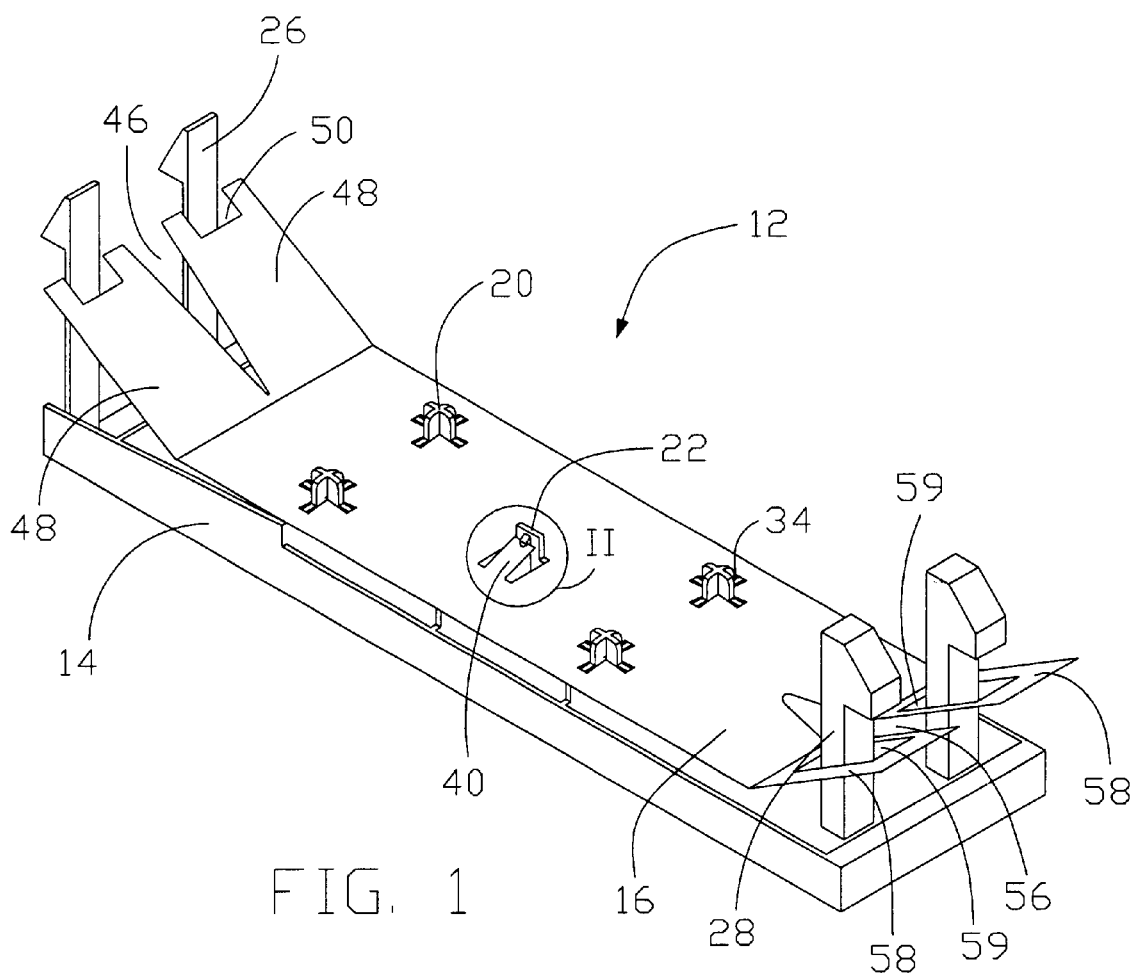
FIG. 1 is an assembled view of a shield assembly in accordance with the present invention.
Figure 2:
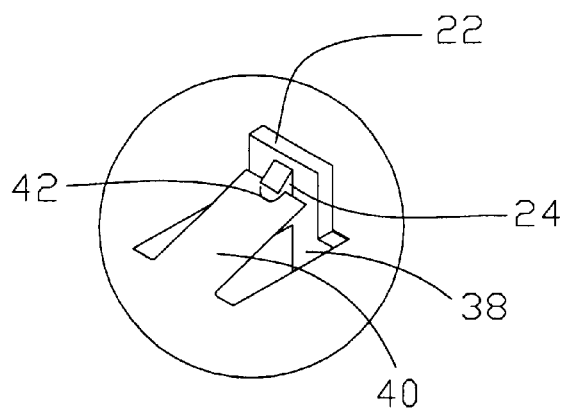
FIG. 2 is an enlarged view of the circled portion II of FIG. 1.

Referring to FIGS. 1 and 2, a shield assembly 12 in accordance with the present invention comprises a plastic member 14 and a metal member 16 attached on an inner side of the plastic member 14.

The plastic member 14 is rectangular. A tab 22 extends upwardly from a central portion of the inner side of the plastic member 14. A projection 24 is formed on one side wall of the tab 22. Four cross protrusions 20 respectively extend upwardly from the inner side of the plastic member 14, two on each side of the tab 22. A pair of spaced fasteners 26 extends upwardly from one end of the inner side of the plastic member 14. A pair of hooks 28 extends upwardly from the other end of the inner side of the plastic member 14, opposite to the fasteners 26. Four cross cuts 34 are defined in the metal member 16 for receiving the four cross protrusions 20 of the plastic member 14, to prevent the metal member 16 from moving relative to the plastic member 14 in a horizontal direction. A gap 38 is defined in a central portion of the metal member 16, for extension of the tab 22 of the plastic member 14 therethrough. An inclined plate 40 extends from an edge of the metal member 16, adjacent the gap 38. An aperture 42 is defined in a free end of the inclined plate 40 for receiving the projection 24 of the plastic member 14, to prevent the metal member 16 from moving relative to the plastic member 14 in a vertical direction. A pair of first arms 48 extends from one end of the metal member 16. A first cutout 46 is defined between the pair of first arms 48. Each first arm 48 defines a cutaway 50 in a free end thereof, for extension of the corresponding fastener 26 of the plastic member 14 therethrough. A pair of second arms 58 extends from the other end of the metal member 16. A second cutout 56 is defined between the pair of second arms 58. Each second arm 58 defines a hole 59 therein, for extension of the corresponding hook 28 of the plastic member 14 therethrough.

In use, the shield assembly 12 is embedded in an opening defined in a front panel of a computer enclosure (not shown).

The fasteners 26 and the hooks 28 of the shield assembly 12 are respectively engaged with the computer enclosure. The first and second arms 48, 58 are resiliently retained against the enclosure such that the metal member 16 covers the opening. Thus electromagnetic radiation is prevented from coming out of the opening.

Figure 3:
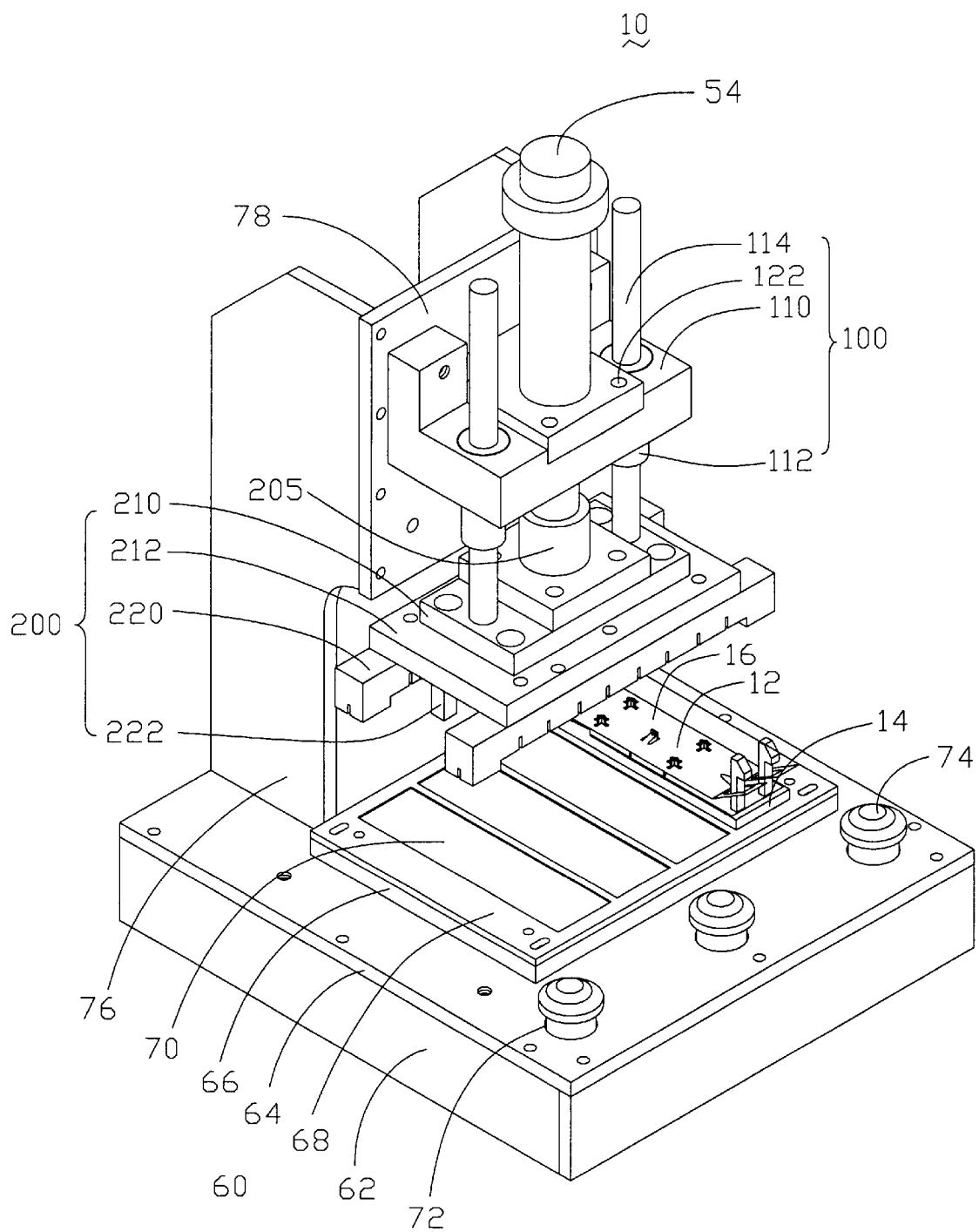
FIG. 3 is a perspective view of a pressing machine for combining the shield assembly of FIG. 1.

Referring to FIG. 3, a pressing machine 10 combines corresponding metal members 16 and plastic members 14 together to form shield assemblies 12 of the present invention. The pressing machine 10 comprises a cylinder 54, a workbench 60, a guide device 100, a pressing device 200, and a coupling bar 205 connected between the cylinder 54 and the pressing device 200.

The workbench 60 comprises four side walls 62 and a top wall 64 disposed on the four side walls 62. A mounting board 66 is secured on the top wall 64. A position board 68 is mounted on the mounted board 66. A plurality of channels 70 is defined in a top surface of the position board 68, for receiving the plastic members 14 of the shield assemblies 12. Three through holes 72 are defined in a front portion of the top wall 64 of the workbench 60, for mounting three buttons 74 therein. A pair of support plates 76 is secured on a rear portion of the top wall 64, opposite to the buttons 74. A vertical plate 78 is connected between side walls of the pair of the support plates 76, forming a space (not labeled) for receiving a control circuit (not shown) therein.

Figure 4:
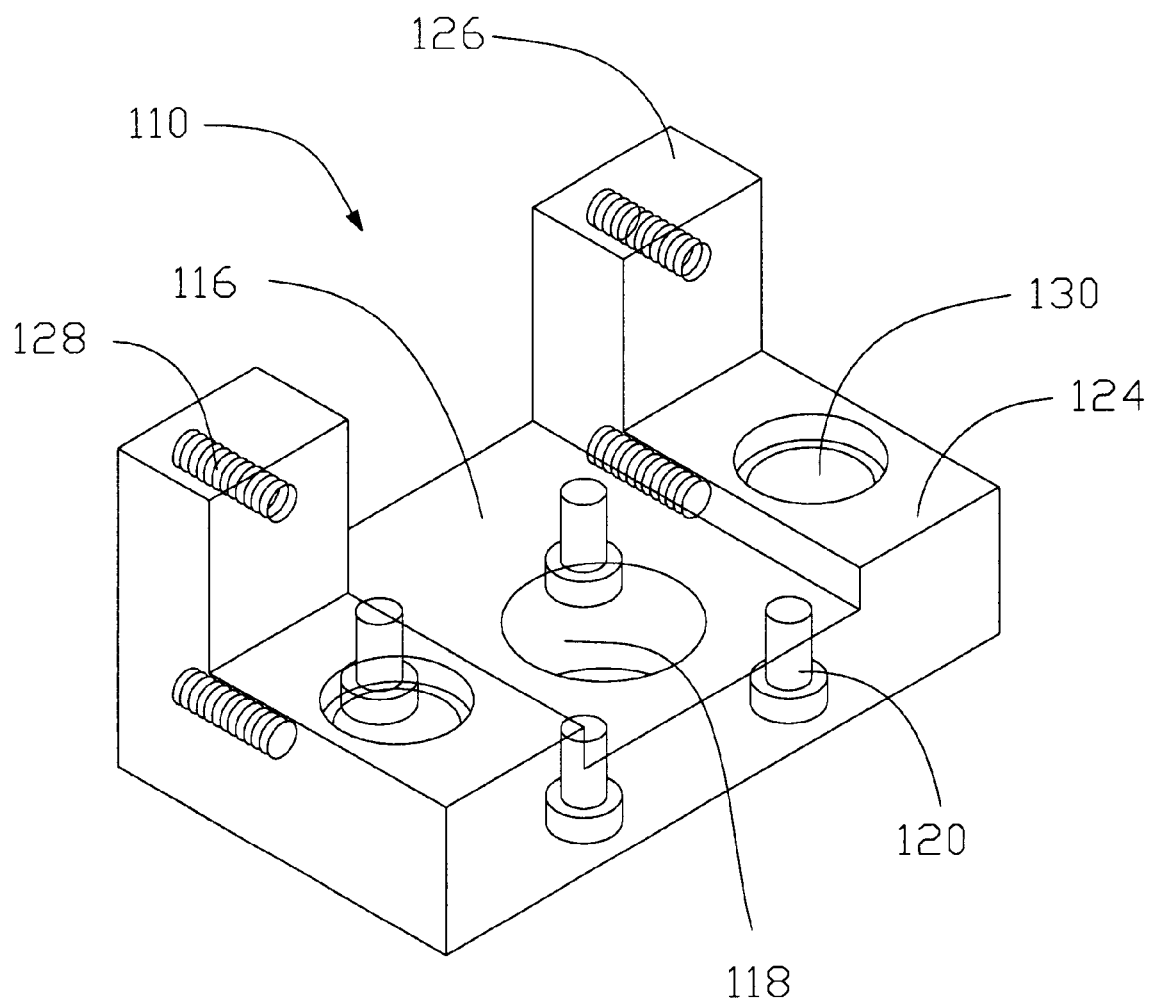
FIG. 4 is a perspective view of a base of a guide device of the pressing machine of FIG. 3.

Referring also to FIG. 4, the guide device 100 comprises a base 110, a pair of guide bushings 112, and a pair of guide posts 114. A recess 116 is defined in a central portion of a top surface of the base 110, forming a pair of shoulders 124 on opposite sides of the recess 116. A passageway 118 is defined in the base 110, below the recess 116. Four first shoulder holes 120 are defined in the base 110, below the recess 116 and around the passageway 118. Each shoulder 124 forms a connecting portion 126 extending upwardly from one end thereof. A second shoulder hole 130 is defined in each shoulder 124. Each connecting portion 126 defines a screw hole 128, for extension of a bolt (not shown) therethrough to engage with the vertical plate 78 and thereby secure the base 110 on the workbench 60.

The cylinder 54 is secured on the base 110 with a chassis (not labeled) thereof received in the recess 116. Four screws 122 are extended through the shoulder holes 120 of the base 110 to engage with threaded holes (not labeled) defined in the cylinder 54. The guide bushings 112 interferentially engage with the base 110 in the second shoulder holes 130. The guide posts 114 respectively extend through the corresponding guide bushings 112.

Figure 5:
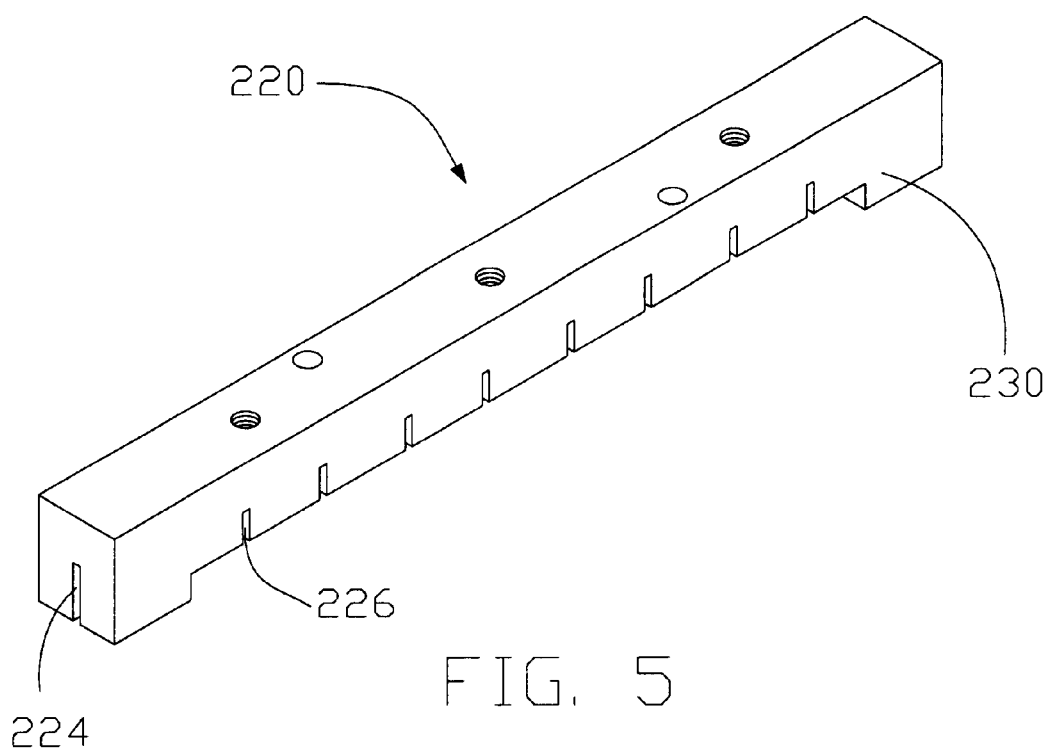
FIG. 5 is a perspective view of a pressing block of FIG. 3.
Figure 6:
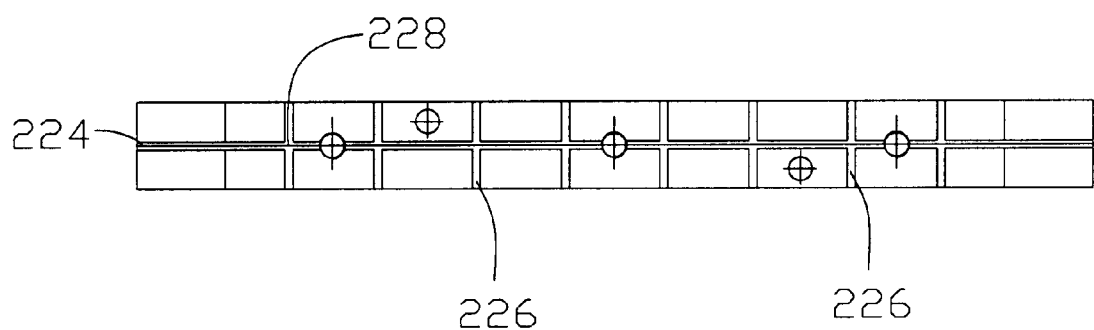
FIG. 6 is a bottom planar view of FIG. 5.
Figure 7:
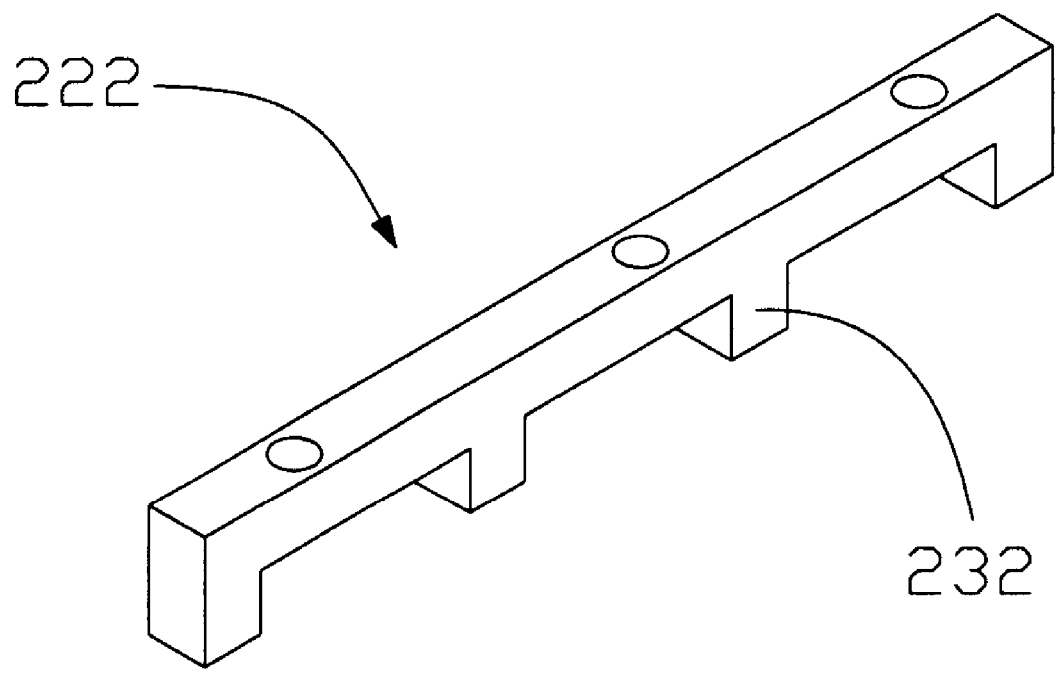
FIG. 7 is a perspective view of a pressing bar of FIG. 3.

Referring also to FIGS. 5–7, the pressing device 200 comprises a connecting plate 210, a bottom plate 212, a pair of pressing blocks 220, and a pressing bar 222. The connecting plate 210 is secured on a top surface of the bottom plate 212. The guide posts 114 of the guide device 100 are secured on opposite sides of the connecting plate 210. The pressing bar 222 is secured under a central portion of a bottom surface of the bottom plate 212. The pair of pressing blocks 220 is respectively secured under the bottom surface of the bottom plate 212, on opposite sides of the pressing bar 222. Each pressing block 220 defines a longitudinal groove 224 in a center of a bottom surface thereof. A plurality of spaced slots 226 is defined in the bottom surface of the pressing block 220, perpendicular to the longitudinal groove 224, thereby forming a plurality of cross indentions 228. A pair of stanchions 230 is formed on opposite sides of the bottom surface of the pressing block 220. The pressing bar 222 forms a plurality of press feet 232, corresponding to the channels 70 of the position board 68.

In operation, the plastic members 14 of the shield assembly 12 are respectively placed on the channels 70 of the position board 68. The corresponding metal members 16 are placed on the plastic members 14, with the cross cuts 34 of the metal members 16 above the corresponding cross protrusions 20 of the plastic member 14. The fasteners 26 of the plastic members 14 respectively extend through the corresponding cutaways 50 of the metal members 16, and the hooks 28 of the plastic members 14 extend through the corresponding holes 60 of the metal members 16. The power supply button of the buttons 74 is then turned on. The coupling bar 205 is pushed downwardly by air pressure of the cylinder 54. The pressing device 200 is accordingly downwardly moved. The cross indentions 228 of the pressing block 220 respectively receive the corresponding cross protrusions 20 of the plastic member 14 therein, and the bottom surface of the pressing block 220 downwardly presses the metal members 16 near the cross openings 340 of the metal members 16. The press feet 232 of the pressing bar 222 respectively downwardly press the inclined plates 40 of the metal members 16, thereby causing the inclined plates 40 to downwardly snap on the corresponding projections 24. The coupling bar 205 continues to move downwardly until the stanchions 230 of the pressing block 220 abut the position board 68 of the workbench 60. At this time, the cross protrusions 20 of the plastic members 14 are completely received in the cross cuts 34 of the metal members 16, and the apertures 42 of the metal member 16 engage with the projections 24 of the plastic member 16.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A shield assembly for covering an opening defined in a computer enclosure comprising:
    a plastic member having at least one protrusion, a tab, and at least one hook and fastener at opposite sides thereof for engaging with the enclosure; and
    a metal member attached on the plastic member, the metal member having at least one opening for engaging with the at least one protrusion of the plastic member to prevent the metal member from moving relative to the plastic member in a horizontal direction, a gap for extension of the tab therethrough, and an inclined plate for engaging with the tab to prevent the metal member from moving relative to the plastic member in a vertical direction.

2. The shield assembly as claimed in claim 1, wherein a projection is formed in the tab, and an aperture is defined in a free end of the inclined plate for engaging with the projection of the tab.

3. The shield assembly as claimed in claim 1, wherein at least one first and second arms extend from opposite ends of the metal member, for engaging with edges of the enclosure adjacent the opening.

4. The shield assembly as claimed in claim 3, wherein each first arm defines a cutaway for extension of the fastener of the plastic member therethrough, and each second arm defines a hole for extension of the hook of the plastic member therein.

5. The shield assembly as claimed in claim 1, wherein the inclined plate extends from an edge of the metal member adjacent the gap toward the gap.

6. A shield assembly for covering an opening defined in a computer enclosure comprising:

a plastic member having a cross protrusion, a tab, and a hook for engaging with the enclosure; and a metal member attached on the plastic member, the metal member having a cross cut engaging with the cross protrusion of the plastic member to prevent the metal member from moving relative to the plastic member in a horizontal direction, a gap for extension of the tab therethrough, and an inclined plate extending toward the gap and engaging with the tab to prevent the metal member from moving relative to the plastic member in a vertical direction.

7. The shield assembly as claimed in claim 6, wherein the inclined plate extends from an-edge of the metal member adjacent the gap.

8. The shield assembly as claimed in claim 6, wherein a projection is formed in the tab, and an aperture is defined in a free end of the inclined plate engaging with the projection of the tab.

9. The shield assembly as claimed in claim 6, wherein the plastic member further has a fastener formed with the hook for cooperatively engaging with the enclosure.

10. A shield assembly for covering an opening defined in a computer enclosure comprising:

a plastic member having a tab, and at least one hook for latchable engagement with the enclosure; and a metal member attached on the plastic member, the metal member having a gap for extension of the tab therethrough, an inclined plate adjacent to said gap for engaging with the tab to prevent the metal member from moving relative to the plastic member in a vertical direction, and an inclined resilient arm with a cutaway therein around said hook to allow said hook to extend therethrough for being resiliently retained against the enclosure when said shield assembly is used to cover the opening of said computer enclosure.

* * * * *